US012405958B2

United States Patent
Sharp et al.

(10) Patent No.: US 12,405,958 B2
(45) Date of Patent: Sep. 2, 2025

(54) TARGETING SYSTEM STATE CONTEXT IN A SEARCH PROCESS IN AN OBSERVABILITY PIPELINE SYSTEM

(71) Applicant: Cribl, Inc., San Francisco, CA (US)

(72) Inventors: Clint Sharp, Oakland, CA (US);
Dritan Bitincka, Edgewater, NJ (US);
Ledion Bitincka, San Francisco, CA (US); Oliver Draese, Los Gatos, CA (US)

(73) Assignee: Cribl, Inc., San Francisco, CA (US)

( * ) Notice: Subject to any disclaimer, the term of this patent is extended or adjusted under 35 U.S.C. 154(b) by 0 days.

(21) Appl. No.: 18/322,054

(22) Filed: May 23, 2023

(65) Prior Publication Data

US 2023/0376491 A1   Nov. 23, 2023

Related U.S. Application Data

(60) Provisional application No. 63/423,264, filed on Nov. 7, 2022, provisional application No. 63/419,632, filed
(Continued)

(51) Int. Cl.
*G06F 16/00* (2019.01)
*G06F 11/34* (2006.01)
(Continued)

(52) U.S. Cl.
CPC .... *G06F 16/24575* (2019.01); *G06F 11/3409* (2013.01); *G06F 16/2453* (2019.01); *G06F 16/248* (2019.01)

(58) Field of Classification Search
CPC ........... G06F 16/24575; G06F 16/2453; G06F 16/248; G06F 11/3409
(Continued)

(56) References Cited

U.S. PATENT DOCUMENTS 7,412,442 B1    8/2008  Vadon et al.
8,285,725 B2 *  10/2012 Bayliss ................. G06F 16/24
                                                707/769
(Continued)

FOREIGN PATENT DOCUMENTS

WO   2023230001   11/2023
WO   2023230005   11/2023
(Continued)

OTHER PUBLICATIONS

USPTO, Final Office Action issued in U.S. Appl. No. 18/321,189 on Aug. 5, 2024, 34 pages.
(Continued)

*Primary Examiner* — Monica M Pyo
(74) *Attorney, Agent, or Firm* — Young Basile Hanlon & MacFarlane, P.C.

(57) ABSTRACT

In some aspects, search functionality is provided in an observability pipeline system. In some implementations, a search query is received at a computer node from a leader role of an observability pipeline system. The search query represents a request to search event data at the computer node and includes a first search operator that specifies a system state context criterion and a second search operator that specifies an event criterion. An observability pipeline process is configured according to the search query. Search results are generated based on applying the observability pipeline process at the computer node. A current system state of the computer node that matches the first search operator is determined; and a subset of event data on the computer node that matches the second search operator is identified. The search results including the subset of event data are sent to the leader role.

11 Claims, 5 Drawing Sheets

Related U.S. Application Data on Oct. 26, 2022, provisional application No. 63/414,762, filed on Oct. 10, 2022, provisional application No. 63/344,864, filed on May 23, 2022.

(51) Int. Cl.
   *G06F 16/2453* (2019.01)
   *G06F 16/2457* (2019.01)
   *G06F 16/248* (2019.01)

(58) Field of Classification Search
   USPC .......................................................... 707/769
   See application file for complete search history.

(56) References Cited

U.S. PATENT DOCUMENTS

| | | | |
|---|---|---|---|
| 8,751,529 | B2 | 6/2014 | Zhang et al. |
| 8,806,361 | B1 | 8/2014 | Noel et al. |
| 8,837,360 | B1 | 9/2014 | Mishra et al. |
| 9,124,612 | B2 | 9/2015 | Vasan et al. |
| 9,130,971 | B2 | 9/2015 | Vasan et al. |
| 9,921,733 | B2 | 3/2018 | Filippi et al. |
| 10,235,460 | B2 | 3/2019 | Ago et al. |
| 10,394,802 | B1 | 8/2019 | Porath et al. |
| 10,599,724 | B2 | 3/2020 | Pal et al. |
| 10,776,355 | B1 | 9/2020 | Batsakis et al. |
| 10,929,415 | B1 * | 2/2021 | Shcherbakov ...... G06F 3/04842 |
| 10,984,044 | B1 | 4/2021 | Batsakis et al. |
| 11,003,682 | B2 | 5/2021 | Porath et al. |
| 11,003,714 | B1 | 5/2021 | Batsakis et al. |
| 11,120,344 | B2 | 9/2021 | Das et al. |
| 11,216,453 | B2 | 1/2022 | Papale et al. |
| 11,216,511 | B1 | 1/2022 | Bigdelu et al. |
| 11,250,056 | B1 | 2/2022 | Batsakis et al. |
| 11,263,268 | B1 | 3/2022 | Bourbie et al. |
| 11,269,476 | B2 | 3/2022 | Noel et al. |
| 11,269,871 | B1 | 3/2022 | Bigdelu et al. |
| 11,281,706 | B2 | 3/2022 | Pal et al. |
| 11,416,563 | B1 * | 8/2022 | Spagnolo .............. G06F 16/951 |
| 11,422,686 | B2 | 8/2022 | Filippi et al. |
| 11,636,128 | B1 | 4/2023 | Bigdelu et al. |
| 2004/0078367 | A1 | 4/2004 | Anderson et al. |
| 2006/0248073 | A1 | 11/2006 | Jones et al. |
| 2008/0059899 | A1 | 3/2008 | Gemmell et al. |
| 2008/0263025 | A1 | 10/2008 | Koran |
| 2008/0270391 | A1 | 10/2008 | Newbold et al. |
| 2008/0301106 | A1 | 12/2008 | Oral et al. |
| 2009/0198596 | A1 | 8/2009 | Dolan et al. |
| 2010/0322255 | A1 | 12/2010 | Hao et al. |
| 2012/0317087 | A1 | 12/2012 | Lymberopoulos et al. |
| 2013/0138638 | A1 | 5/2013 | Karenos et al. |
| 2014/0059120 | A1 | 2/2014 | Richardson et al. |
| 2015/0032728 | A1 | 1/2015 | Rozich et al. |
| 2015/0242416 | A1 | 8/2015 | Nakano et al. |
| 2016/0226731 | A1 | 8/2016 | Maroulis |
| 2017/0075990 | A1 * | 3/2017 | Leu ...................... G06F 11/3409 |
| 2018/0082410 | A1 | 3/2018 | Schulte |
| 2018/0232465 | A1 | 8/2018 | Yonekawa et al. |
| 2019/0130003 | A1 | 5/2019 | Maiti et al. |
| 2020/0012638 | A1 * | 1/2020 | Luo ........................ G06F 16/248 |
| 2020/0097481 | A1 | 3/2020 | Cosentino et al. |
| 2020/0257680 | A1 | 8/2020 | Danyi et al. |
| 2021/0117425 | A1 | 4/2021 | Rao et al. |
| 2021/0133650 | A1 | 5/2021 | Cella et al. |
| 2021/0279265 | A1 * | 9/2021 | Stevens .............. G06F 16/9024 |
| 2021/0287156 | A1 | 9/2021 | Rogynskyy et al. |
| 2021/0382964 | A1 | 12/2021 | Moore et al. |
| 2022/0147000 | A1 | 5/2022 | Cooley et al. |
| 2022/0191148 | A1 | 6/2022 | Raindel |
| 2023/0041129 | A1 | 2/2023 | Terlecki et al. |
| 2023/0095756 | A1 | 3/2023 | Wilkinson et al. |
| 2023/0350931 | A1 | 11/2023 | Lewis et al. |
| 2023/0376483 | A1 | 11/2023 | Sharp et al. |
| 2023/0376498 | A1 | 11/2023 | Sharp et al. |
| 2023/0376509 | A1 | 11/2023 | Sharp et al. |

FOREIGN PATENT DOCUMENTS

| | | |
|---|---|---|
| WO | 2023230047 | 11/2023 |
| WO | 2023230048 | 11/2023 |

OTHER PUBLICATIONS

USPTO, Non-Final Office Action issued in U.S. Appl. No. 18/321,267 on Jul. 1, 2024, 59 pages.
WIPO, International Search Report and Written Opinion issued in Application No. PCT/US2023/023214 on Aug. 22, 2023, 12 pages.
WIPO, International Search Report and Written Opinion issued in Application No. PCT/US2023/023213 on Aug. 22, 2023, 13 pages.
WIPO, International Search Report and Written Opinion issued in Application No. PCT/US2023/023118 on Aug. 22, 2023, 9 pages.
WIPO, International Search Report and Written Opinion issued in Application No. PCT/US2023/023123 on Aug. 22, 2023, 9 pages.
USPTO, Non-Final Office Action issued in U.S. Appl. No. 18/321,189 on May 10, 2024, 49 pages.
USPTO, Notice of Allowance issued in U.S. Appl. No. 18/322,048 on Apr. 29, 2024, 25 pages.

\* cited by examiner

TARGETING SYSTEM STATE CONTEXT IN A SEARCH PROCESS IN AN OBSERVABILITY PIPELINE SYSTEM

CROSS-REFERENCE TO RELATED APPLICATIONS

This application claims priority to U.S. Provisional Patent Application No. 63/344,864, filed May 23, 2022, entitled "Observability Platform Search;" U.S. Provisional Patent Application No. 63/414,762, filed Oct. 10, 2022, entitled "Observability Platform Search;" U.S. Provisional Patent Application No. 63/419,632, filed Oct. 26, 2022, entitled "Observability Platform Search;" and U.S. Provisional Application No. 63/423,264, filed Nov. 7, 2022, entitled "Observability Platform Search." Each of the above-referenced priority documents is incorporated herein by reference.

BACKGROUND

The following description relates to using system state context in a search process in an observability pipeline system.

Observability pipelines are used to route and process data in a number of contexts. For example, observability pipelines can provide unified routing of various types of machine data to multiple destinations while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DETAILED DESCRIPTION

Figure 1:
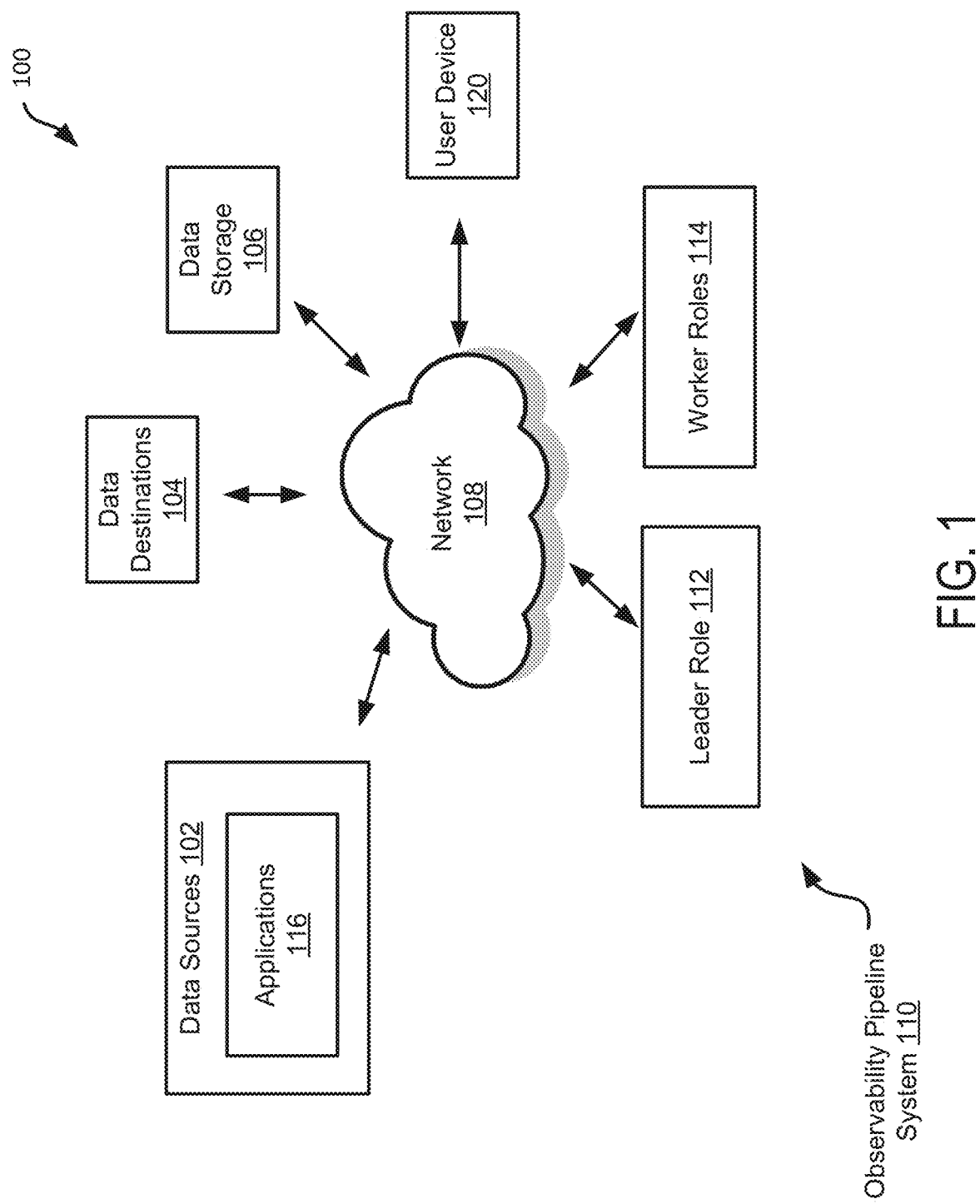
FIG. 1 is a block diagram showing aspects of an example computing environment that includes an observability pipeline system.

In some implementations, an observability pipeline system provides search functionality that allows event data to be searched in a computing environment. In some implementations, the search functionality searches event data without a priori knowledge of the characteristics of the data being searched, for example, without prior knowledge of the shape, structure, size, age, format, compression status or other attributes of the data. In some cases, knowledge of where the data resides can improve focusing and scoping of searches by allowing search queries that include filters that target attributes that are not part of the data but of the environment or the source itself. These attributes can be tracked and emitted by endpoint nodes and made available to address (e.g., as fields) in searches. For example, a search query may search for "error" on all log files currently written to by running processes. Such a search query can be executed without the need to collect all log files or all data points. Instead, when the search query is executed, the "non-data" system conditions can be evaluated as point-in-time checks against the system state context at that specific time. In the example above, the system state context targeted by the search query is the set of running processes, and the search process can examine data generated by the set of running processes. In some instances, the search can be performed by configuring and applying an observability pipeline process.

In some aspects of what is described here, a search query targets event data from a specified environment or system state context. In some cases, the search query may specify a system state context associated with processes, hardware, listening ports, logged-in users, network interfaces or other attributes of an environment. For instance, the search query may target event data generated by processes that are currently running, event data generated by processes that currently have logged in users, event data generated by processes that currently have network connections, event data generated by processes that have a certain CPU utilization, event data on computer nodes with hardware that currently have a specified operating state, event data on computer nodes with a certain number of logged-in users, event data on computer nodes with a certain number of active listening ports or network interfaces, and others. In response to such a search query, a computer node (e.g., an endpoint node) can execute a search process that applies the specified system state context as a filter or limit on the scope of the search. As an example, the search process may identify processes that match the targeted system state context and search only event data generated by the identified processes. As another example, the search process may identify whether a computer node's hardware state matches the targeted system state context as a prerequisite for searching event data on the computer node. By searching only the data in the targeted system state context, the search process can avoid the need to collect and search additional data, which can allow a more efficient and targeted search and provide additional advantages. In some implementations, a search engine can identify types of the search operators in a search query, including search operators that specify a system state context criterion and search operators that specify an event criterion, and reorganize the order of the search operators in the search query or determine an optimized order of the search operators in the search query according to the parameter types. In some implementations, the reorganized search query can be executed efficiently; improve the relevance and accuracy of the search results; and improve the efficiency and reduce the cost of the search operation. Accordingly, aspects of the systems and techniques described here can be used to improve the operation of computer systems, information and data management systems, observability pipeline systems, and other classes of technology.

In some implementations, search functionality can enable personnel (e.g., administrators, users, etc.) with a single search tool to query event data without having to re-collect the event data. In some implementations, search functionality can be performed on data at rest, e.g., data that is already collected and stored. For example, when event data is already in S3 (or similar) or even collected in a system of analysis, like Splunk, Elastic, etc., in an organization's observability lake or even within existing systems, such event data can also be queried. In some instances, the event data to be queried can include structured, semi-structured, and unstructured data. The search functionality can be performed based on any terms, patterns, value/pairs, and any data type. In some implementations, the search functionality can vastly increase the scope of analysis without requiring the cost or complexity of first shipping, ingesting, and storing the data. In some implementations, search functionality is not restricted to a single location, a single bucket, or a single vendor platform for the data.

The systems and techniques described here can provide technical advantages and improvements over existing technologies. As an example, search functionality provided in an observability pipeline system can allow enterprise computer systems to extract value from observability pipeline systems more efficiently while conserving computing resources. This can improve accessibility to data in endpoint devices, lakes, S3, the edge, etc. Search functionality may require minimal setup to use and no extra infrastructure. Search functionality can quickly scale to provide ephemeral on-demand compute to handle large search jobs and scale back once complete. Search language may be based on Kusto Query Language or another query language or dialect.

In some implementations, a search scope of a search process is defined by search operators in a search query. In some instances, the order of the search operators in the search query can impact the efficiency, accuracy, effectiveness or speed of the search process. Accordingly, in some cases, the order of the search operators can be modified (e.g., relative to an initial search query constructed, for example, by a user or based on user input) to improve the search process. In some instances, after receiving the initial search query, a search engine may reorganize the execution order of the search operators by prioritizing execution of certain types of search operators. For example, when a search query includes a first subset of search operators, each of which specifies a system state context criterion, the system state parameters can be checked first to obtain a current value of the system state parameter based on the first subset of search operators. A subset of nodes or processes can then be identified by determining whether the current system state of the computer node matches the system state context criterion specified by the first subset of search operators in the search query. Subsequently, the search process continues with searching event data on the computer node based on an event criterion specified by each of a second subset of search operators in the search query.

FIG. 1 is a block diagram showing aspects of an example computing environment 100 that includes an observability pipeline system 110. The example computing environment 100 shown in FIG. 1 includes data sources 102, data destinations 104, data storage 106, network 108, and a user device 120. The data sources 102 includes an application 116 that produces data that can be searched by the observability pipeline system 110. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. These data sources can include applications 116 and other types of computer resources. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have to use a common format or structure, and the observability pipeline system 110 can generate structured output data having a specified form, format, or type. The output generated by the observability pipeline system can be delivered to data destinations 104, data storage 106, or both. In some cases, the data delivered to the data storage 106 includes the original machine data that was generated by the data sources 102, and the observability pipeline system 110 can later retrieve and process the machine data that was stored on the data storage 106. In some instances, the data source 102 may include a search engine as part of the observability pipeline system 110. For example, the data source 102 may be implemented as the endpoint node 304 in FIG. 3 or in another manner.

In general, the observability pipeline system 110 can provide several services for processing and structuring machine data for an enterprise or other organization. In some instances, the observability pipeline system 110 provides schema-agnostic processing, which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, de-normalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity.

The data sources 102, data destinations 104, data storage 106, observability pipeline system 110, and the user device 120 are each implemented by one or more computer systems that have computational resources (e.g., hardware, software, firmware) that are used to communicate with each other and to perform other operations. For example, each computer system may be implemented as the example computer system 500 shown in FIG. 5 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data is provided to the observability pipeline system 110 through the network 108. In some cases, the machine data is streamed to the observability pipeline system 110 as pipeline input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafka, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources. The data sources 102 can also include other applications 116.

In the example shown in FIG. 1, the application 116 includes a collection of computer instructions that constitute a computer program. The computer instructions reside in memory 420 and execute on a processor 410. The computer instructions can be compiled or interpreted. An application 116 can be contained in a single module or can be statically or dynamically linked with other libraries. The libraries can be provided by the operating system or the application provider.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The pipeline output data produced by the observability pipeline system 110 can be communicated to the data destinations 104 through the network 108.

The data storage 106 can include multiple user devices, servers, databases, hosted services, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provide access to data through REST API calls or custom scripts, or a combination of these and other data storage systems. The pipeline output data, which may include the machine data from the data sources 102 as well as data analytics and other output from the observability pipeline system 100, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as pipeline input data to be processed by the observability pipeline system 110. The observability pipeline system 110 generates pipeline output data by applying observability pipeline processes to the pipeline input data and communicates the pipeline output data to the data destinations 104. In some implementations, the observability pipeline system 110 operates as a buffer between data sources and data destinations, such that all data sources send their data to the observability pipeline system 110, which handles filtering and routing the data to proper data destinations.

In some implementations, the observability pipeline system 110 unifies data processing and collection across many types of machine data (e.g., metrics, logs, and traces). The machine data can be processed by the observability pipeline system 110 by enriching it and reducing or eliminating noise and waste. The observability pipeline system 110 may also deliver the processed data to any tool in an enterprise designed to work with observability data. For example, the observability pipeline system 110 may analyze event data and send analytics to multiple data destinations 104, thereby enabling the systematic observation of event data for known conditions that require attention or other action. Consequently, the observability pipeline system 110 can decouple sources of machine data from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications 116 while minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb), and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability pipeline system 110 shown in FIG. 1 includes a leader role 112 and multiple worker role 114. The leader role 112 leads the overall operation of the observability pipeline system 110 by configuring and monitoring the worker roles 114; the worker roles 114 receive event data streams from the data sources 102 and data storage 106, apply observability pipeline processes to the event data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The user device 120, the observability pipeline system 110, or both, can provide a user interface for the observability pipeline system 110. Aspects of the user interface can be rendered on a display (e.g., the display 550 in FIG. 5) or otherwise presented to a user. The user interface may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application can be deployed as a file, executable code, or another type of machine-readable instructions executed on the user device 120. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the user device 120 or may invoke the APIs, which can access functionality of the observability pipeline system 110. The observability pipeline application may be rendered and executed within another application (e.g., as a plugin in a web browser), as a standalone application, or otherwise. In some cases, an observability pipeline application may be deployed as an installed application on a workstation, as an "app" on a tablet or smartphone, as a cloud-based application that accesses functionality running on one or more remote servers, or otherwise.

In some implementations, the observability pipeline system 110 is a standalone computer system that includes only a single computer node. For instance, the observability pipeline system 110 can be deployed on the user device 120 or another computer device in the computing environment 100. For example, the observability pipeline system 110 can be implemented on a laptop or workstation. The standalone computer system can operate as the leader role 112 and the worker roles 114 and may execute an observability pipeline application that provides a user interface as described above.

In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader node) may communicate with the user device 120, for example, through an observability pipeline application that provides a user interface as described above. In some cases, the leader node and each of the worker nodes are distinct computer devices in the computing environment 100. In some cases, the leader node and each of the worker nodes can communicate with each other using TCP/IP protocols or other types of network communication protocols transmitted over a network (e.g., the network 108 shown in FIG. 1) or another type of data connection.

In some implementations, the observability pipeline system 110 is implemented by software installed on private enterprise servers, a private enterprise computing device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 is implemented by software running on a cloud-based computing system that provides a cloud hosting service. For example, the observability pipeline system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

In some implementations, search functionality is available through the cloud-based computing system and is provided by the observability pipeline system 110. In some instances, no additional search agent is required to perform search actions. For search-at-rest (e.g., searching AWS S3 buckets), a search process can automatically launch "executor" processes to perform the query locally. The search functionality of the observability pipeline system 110 may be performed according to a leader-to-worker node/endpoint node control protocol, or another type of control protocol.

In some implementations, search functionality is bounded by groups to support role-based access control, application of computing resources, and other functions. A search functionality can be specified in a query. A search source can be defined by one or more datasets, referenced in the query. In certain instances, the number of search sources can be defined in the query by the number of datasets or search strings.

In some implementations, operators that are supported by search functionality of the observability pipeline system 110 may include: Cribl—(Default) Custom Cribl operator—Simplifies locating specific events; Search—Locates specific events with specific text strings; Where—Filters events based on a Boolean expressions; Project—Define columns used to display results; Extend—Calculates one or more expressions and assigns the results to fields; Find—Locates specific events; Timestats—Aggregates events by time periods or bins; Extract—Extracts information from a field either via parser or regular expression; Summarize—Produces a table that aggregates the content of the input table; Limit (alias Take)—Defines the number of results to return; and other operators that enable other query capabilities. In some instances, other operators and functions may also be supported by the observability pipeline system 110.

In some implementations, search functionality supports multiple functions, including Cribl, Content, Scalar, Statistical and other function types. In some instances, different functions are available in a search language help tab of the user interface of the search functionality to define syntax, rules and provide examples for all Operators and Functions. In some instances, search recommendations may be included in the search functionality, e.g., default search settings, sample search queries, etc. The user interface of the search functionality may also include a history tab for displaying previous search queries. In some implementations, the search functionality supports complex search queries that includes multiple datasets, terms, Boolean logic, etc. These search terms or expressions can be grouped as a single search string. Wildcards may be supported for query bar terms and datasets.

In some cases, during operation, personnel (e.g., system administrators) can connect their user interface to the cloud-based computing system. A search window may appear on the user interface of the search functionality as a peer to the observability pipeline system 110. Data to query can be identified, which can be accomplished via datasets in a query or in another manner. In some contexts, a dataset is an addressable set of data defined in the query at various locations including endpoint nodes, cloud-based storage systems (e.g., S3 buckets), etc. Predefined datasets can be included in the search functionality, providing the ability to query state information of the observability pipeline system 110 as well as the filesystem of endpoint nodes. These include dataset definitions for leader nodes, endpoint nodes, filesystems, and S3. In some cases, administrators can define and configure their own datasets. In some implementations, the dataset model includes Name the Dataset—any unique identifier; Apply Dataset Provider—Identify external system (e.g., endpoint node, S3 Bucket, etc.); and Apply Dataset Provider Type—this identifies the schema (e.g., Cribl, Filesystem, S3, etc.).

In some instances, a search bar in the user interface can be configured to identify query values. Search functionality may support all personas, as a result the query expression can be simple terms or more complex literals, regexes, JavaScript expressions, etc. In some implementations, data to be queried is identified; and one or more datasets are defined. In some implementations, the search bar at the user interface of the search functionality includes "type-ahead" capability for syntax completion and query history. For example, by just typing "Dat." the type-ahead capability can provide a list of available datasets. In some implementations, the query operators are defined. Functions, terms, strings, and other query operators can be defined in a query and separated by a "|" (pipe).

In certain instances, one or more time ranges for queries can be defined. The one or more time ranges may include real-time windows—seconds, minutes, hours, days; specific time range, e.g., Mar. 20, 2022: 06:00-06:30; or others. A search process can be performed according to the query. Discovery data can be returned as part of the search results as line items in table format, charts, or in another manner. The search results can be shaped and discovered data can be aggregated as part of the query (e.g., Project, Extend, Summarize operators) or afterwards with charting options. In some implemented, different chart types, color palettes, axis settings, legends to manipulate how results are displayed can be selected or defined/configured by the user. In some examples, the number of search results are limited by the query language, including time range. In certain examples, a number of results returned can also be constrained via the "Limit" operator (e.g., Limit 100 or another number).

In some cases, a search query can specify a location of data to be searched. For example, the search query can indicate or otherwise represent a request to search data stored at a computer node (e.g., any of the data sources 102, any of the data destinations 104, any data storage 106, etc.). The storage location can be specified by a name (e.g., "EnterpriseData1", "DataCenter834", etc.), by a geographical location or region (e.g., "Ashburn, VA"; "US East"; "North America"; etc.), by an IP address or other identifier, or the storage location can be specified in another manner. The search query can implicitly or explicitly represent the location to be searched. For instance, the search query may include an explicit indication of a location to be searched (e.g., based on data entered or selected in a user interface), or the location to be searched may be specified implicitly based on the context of the search query (e.g., search history, etc.), the type of data being searched, etc.

In some cases, search functionality may allow users to tune the scope of the search query as wide or narrow by specifying constraints within the search itself. For example, a "wide" search query can specify a search for instances of 'error' on any workgroup or fleet (which may include a group of devices, equipment, computers or nodes within a small network); a "narrow" search query can specify a search for instances of 'error' on host: xyx, in: Var/log directory; and a query can be anywhere in between the wide and narrow queries based on rules.

In some instances, the search functionality can query data from specific third-party vendor platforms. Third-party search functions and the search functionality of the observability pipeline system 110 work independently. Administrators may use search results from the search functionality of the observability pipeline system 110 to apply additional configurations to their existing systems and/or configure. The observability pipeline system 110 can forward discovered data or other search results to the third-party systems or platforms. When accessing external data stores (e.g., AWS S3), the search functionality can define authentication rights when the specific dataset is defined. In some instances, the search functionality can also query system state context by checking or probing current values of system state parameters, which are dynamic and thus, different from event data stored in log files.

In some implementations, a search query generated by a user device is received at the observability pipeline system 110 (e.g., the leader role 112) through the network 108. The observability pipeline system 110 can identify one or more data sources 102 according to the search query. The search query is then dispatched to the identified one or more data sources 102 via the network 108. In some instances, a data source may be an endpoint node which includes an edge agent as part of the observability pipeline system 110. In this case, the leader role 112 may initiate the edge agent to inspects the data source; identifies processes running on the data source; explores and discovers log files according to the search query; generate observability pipeline output data; augment the observability pipeline output data with metadata obtained from the data source; and routes the augmented observability pipeline output data to a data destination (e.g., a cloud-based centralized node, a user device, a data storage, the leader role 112 or the worker roles 114 of the observability pipeline system 110).

In some implementations, a search query is generated at the user device 120 based on user input. For instance, the search query may be generated based on search terms entered by a user through a user interface provided by a web browser or other application running on the user device 120. The search query represents a request to search for data that meets specified criteria; for instance, the search query may include search operators that specify target values of parameters. In some examples, a search operator may specify a target value for event type, event time, event origin, event source, system state context, or other parameters. When the user device 120 receives or otherwise obtains search results for the search query, the search results can be displayed to the user. For instance, the search results may be displayed in a user interface provided by a web browser or other application running on the user device 120.

In some implementations, the search query is received by an agent of the observability pipeline system 110 (e.g., an agent running at the user device 120, on a server, in the cloud or elsewhere), and the agent can dispatch the search query to an appropriate resource in the observability pipeline system 110. The agent may dispatch the search query to one or more computer resources, computer systems, or locations associated with the data to be searched. For instance, a search query may be dispatched to a resource, system or location associated with a data source 102, a data destination 104, a data storage 106. Accordingly, the observability pipeline system 110 can perform the search at an endpoint node, on a server, on a cloud-based storage facility, or elsewhere.

In some implementations, a search is performed by configuring and executing an observability pipeline process. For example, an observability pipeline process (e.g., the observability pipeline process 200 shown in FIG. 2) can be configured to perform a search according to a search query. Configuring an observability pipeline process can include selecting, defining, or configuring any aspect or feature of the observability pipeline process. For example, configuring the observability pipeline process may include selecting a source that will provide input data for the observability pipeline process, selecting a destination where the output data from the observability pipeline process will be sent, configuring a pipeline engine (e.g., by selecting and applying configuration settings to routes and pipelines) that will process the data. In some examples, the pipelines or aspects of a pipeline engine can include filters that are configured based on the search query. For instance, a pipeline can be configured to select events according to a search operator, for example, events that match a target value for event type, event time, event origin, event source, etc. In some examples, the data source for the observability pipeline process is defined based on the search query. For instance, if a search query specifies a device or application to be searched, the data source for the observability pipeline process can be defined as the specified device or application. In some examples, the data destination for the observability pipeline process is defined based on the search query. For instance, the agent that dispatched the search query can be defined as the data destination for the observability pipeline process.

Figure 2:
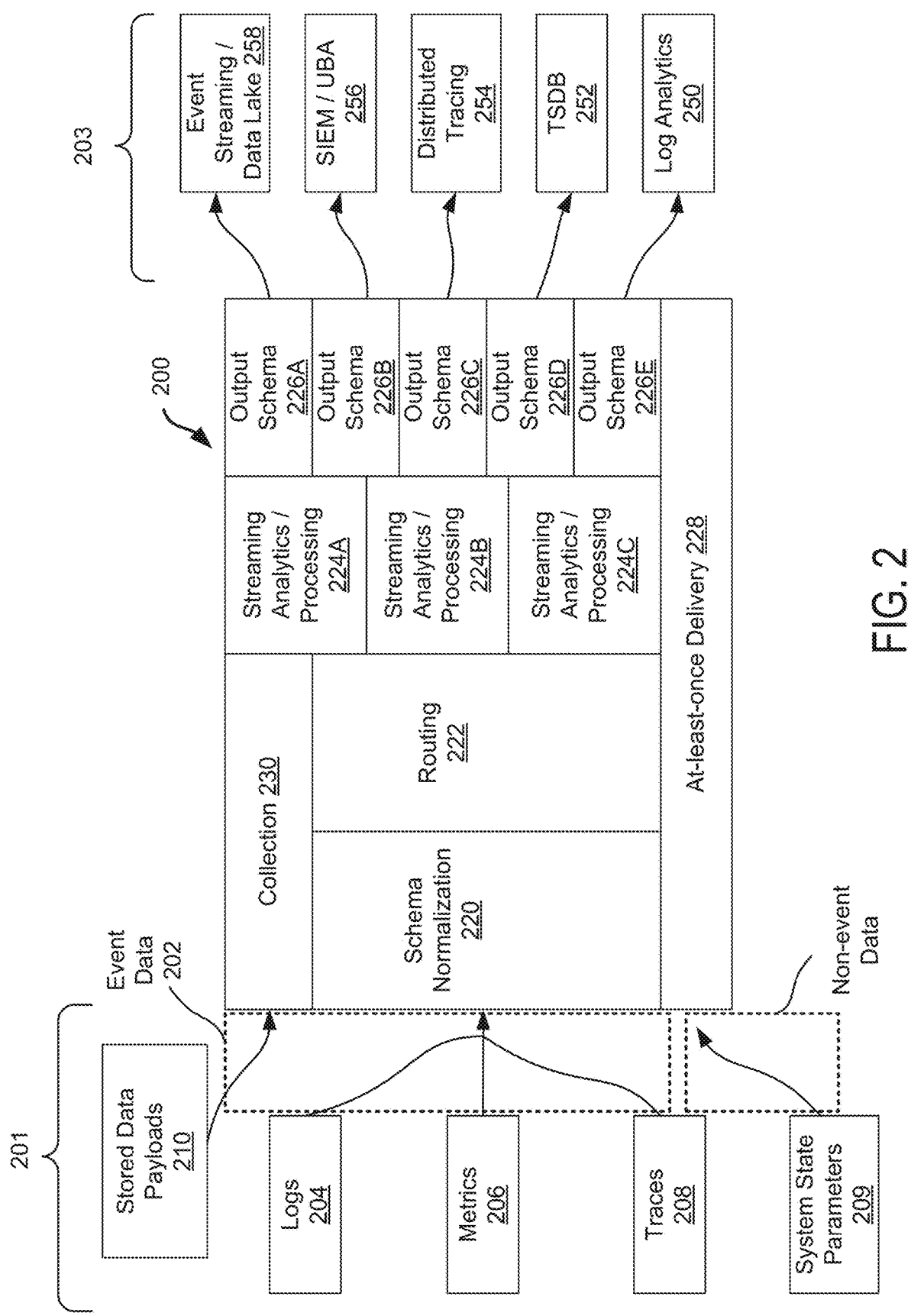
FIG. 2 is a block diagram showing aspects of an example observability pipeline process.

FIG. 2 is a block diagram showing aspects of an example observability pipeline process 200. For example, the observability pipeline process 200 may be configured to perform a search. In some instances, the observability pipeline process 200 can be configured and applied by one or more of the worker roles 114 or the data sources 102 of the example observability pipeline system 110 shown in FIG. 1, the endpoint node 304 shown in FIG. 3, or other nodes of an observability pipeline system. In some instances, the observability pipeline process 200 can be configured and applied by a search engine (e.g., the search engine 308 shown in FIG. 3) based on a search query. In some cases, the observability pipeline process 200 performs a search process over locally stored data, for example, over various types of data (e.g., the event data 306 and the system state parameters 310 in FIG. 3).

The example observability pipeline process 200 shown in FIG. 2 includes data collection 230, schema normalization 220, routing 222, streaming analytics and processing 224A, 224B, 224C, and output schematization 226A, 226B, 226C, 226D, 226E. The observability pipeline process 200 may include additional or different operations, and the operations of the observability pipeline process 200 may be performed as described with respect to FIG. 2 or in another manner. In some cases, one or more of the operations can be combined, or an operation can be divided into multiple sub-processes. Certain operations may be iterated or repeated, for example, until a terminating condition is reached.

As shown in FIG. 2, the observability pipeline process 200 is applied to pipeline input data 201 from data sources, and the observability pipeline process 200 delivers pipeline output data 203 to data destinations. The data sources can include any of the example data sources 102 or data storage 106 described with respect to FIG. 1, and the data destinations can include any of the example data destinations 104 or data storage 106 described with respect to FIG. 1.

The example pipeline input data 201 shown in FIG. 2 includes logs 204, metrics 206, traces 208, system state parameters 209, stored data payloads 210, and possibly other types of machine data. In some cases, some or all of the machine data can be generated by agents (e.g., Fluentd, Collectd, OpenTelemetry) that are deployed at the data sources, for example, on various types of computing devices in a computing environment (e.g., in the computing environment 100 shown in FIG. 1, or another type of computing environment). The logs 204, metrics 206, and traces 208 can be decomposed into event data 202 that are consumed by the observability pipeline process 200. In some instances, logs 204 can be converted to metrics 206, metrics 206 can be converted to logs 204, or other types of data conversion may be applied.

In the example shown in FIG. 2, the system state parameters 209 include various information that describe the current system state of a computer node. These parameters can be used to monitor the performance of the computer node and diagnose any problems that may arise. The system state parameters 209 are dynamic and their values can be probed by the example observability pipeline process in real-time. In some implementations, the information included in the system state parameters 209 is non-event data and is different from the event data that are obtained from the logs 204, metrics 206, traces 208, etc. In some implementations, the system state parameters 209 includes hardware state information or system utilization, e.g., CPU usage, memory usage, disk usage, system uptime, buffer size, etc., network activity and interfaces, listening ports, processes on the computer node, logged-in users on the computer node, or other software and hardware information of the computer node. The CPU usage indicates how much of the CPU's processing power is being used by the computer node at any given time; the memory usage shows how much memory is being used by the computer node at any given time; the disk usage indicates how much of the hard disk or SSD storage space is being used by the computer node; the network activity indicates how much data is being sent or received by the computer node; and the system uptime indicates how long the system has been running without being restarted. In some instances, the system state parameters can be obtained through the use of performance monitoring tool of the computer node or in another manner.

In some instances, the non-event data obtained from system state parameters may include a current temperature of hardware on the computer node, e.g., motherboard, CPU, GPU, hard drive, etc.; a current rotational speed of the fan of the power supply on the computer node; a list of currently running processes; a list of currently logged in users; a current state of all network interfaces; a current buffer size of the network, disk, and interface; a current signal strength on wireless communication interfaces (e.g., Wi-Fi); and a current list of all listening ports across all processes. Values of the system state parameters change over time and can be identified in real-time.

In the example shown, the stored data payloads 210 represent event data retrieved from external data storage systems. For instance, the stored data payloads 210 can include event data that an observability pipeline process previously provided as output to the external data storage system.

The event data 202 are streamed to the observability pipeline process 200 for processing. Here, streaming refers to a flow of data, which is distinct from batching or batch processing. With streaming, data are processed as they flow through the system, e.g., continuously (as opposed to batching, where individual batches are collected and processed as discrete units). As shown in FIG. 2, the event data from the logs 204, metrics 206, and traces 208 are streamed directly to the schema normalization process (at 220) without use of the collection process (at 230), whereas the event data from the stored data payloads 210 are streamed to the collection process (at 230) and then streamed to the schema normalization process (at 220), the routing process (at 222) or the streaming analytics and processing (at 224).

In some instances, event data 202 represents events as structured or typed key value pairs that describe something that occurred at a given point in time. For example, the event data 202 can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data 202 are provided in the smallest unit of observability (e.g., for a given event type or computing environment). For instance, the event data 202 can include data elements that provide insight into the performance of the computing environment 100 to monitor, track, and triage incidents (e.g., to diagnose issues, reduce downtime, or achieve other system objectives in a computing environment).

In some instances, logs 204 represent events serialized to disk, possibly in several different formats. For example, logs 204 can be strings of text having an associated timestamp and written to a file (often referred to as a flat log file). The logs 204 can include unstructured logs or structured logs (e.g., in JSON format). For instance, log analysis platforms store logs as time series events, and the logs 204 can be decomposed into a stream of event data 202.

In some instances, metrics 206 represent summary information about events, e.g., timers or counters. For example, a metric can have a metric name, a metric value, and a low cardinality set of dimensions. In some implementations, metrics 206 can be aggregated sets of events grouped or collected at regular intervals and stored for low cost and fast retrieval. The metrics 206 are not necessarily discrete and instead represent aggregates of data over a given time span. Types of metric aggregation are diverse (e.g., average, total, minimum, maximum, sum-of-squares), but metrics typically have a timestamp (representing a timespan, not a specific time); a name; one or more numeric values representing some specific aggregated value; and a count of how many events are represented in the aggregate.

In some instances, traces 208 represent a series of events with a parent/child relationship. A trace may provide information about an entire user interaction and may be displayed in a Gantt-chart-like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

The example pipeline output data 203 shown in FIG. 2 include data formatted for log analytics platforms (250), data formatted for time series databases (TSDBs) (252), data formatted for distributed tracing systems (254), data formatted for security information and event management (SIEM) or user behavior analytics (UBA) systems 256, and data formatted for event streaming systems or data lakes 258 (e.g., a system or repository of data stored in its natural/raw format). Log analytics platforms are configured to operate on logs to generate statistics (e.g., web, streaming, and mail server statistics) graphically. TSDBs operate on metrics; for example, TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. Pipeline output data 203 may be formatted for, and delivered to, other types of data destinations in some cases.

In the example shown in FIG. 2, the observability pipeline process 200 includes a schema normalization module that (at 220) converts the various types of event data 202 to a common schema or representation to execute shared logic across different agents and data types. For example, machine data from various agents such as Splunk, Elastic, Influx, and OpenTelemetry have different opinionated schemas, and the schema normalization module can convert the event data to normalized event data. Machine data intended for different destinations may need to be processed differently. Accordingly, the observability pipeline process 200 includes a routing module that (at 222) routes the normalized event data (e.g., from the schema normalization module 220) to different processing paths depending on the type or content of the event data. The routing module can be implemented by having different streams or topics. The routing module routes the normalized data to respective streaming analytics and processing modules. FIG. 2 shows three streaming analytics and processing modules, each applied to normalized data (at 224A, 224B, 224C); however, any number of streaming analytics and processing modules may be applied. Each of the streaming analytics and processing modules can aggregate, suppress, mask, drop, or reshape the normalized data provided to it by the routing module. The streaming analytics and processing modules can generate structured data from the normalized data provided to it by the routing module. The observability pipeline process 200 includes output schema conversion modules that (at 226A, 226B, 226C, 226D, 226E) schematize the structured data provided by the streaming analytics and processing modules. The structured data may be schematized for one or more of the respective data destinations to produce the pipeline output data 203. For instance, the output schema conversion modules may convert the structured data to a schema or representation that is compatible with a data destination. In some implementations, the observability pipeline process 200 includes an at-least-once delivery module that (at 228) applies delivery semantics that guarantee that a particular message can be delivered one or more times and will not be lost. In some implementations, the observability pipeline process 200 includes an alerting or centralized state module, a management module, or other types of sub-processes.

In the example shown in FIG. 2, the observability pipeline process 200 includes a collection module that (at 230) collects filtered event data from stored data payloads 210. For example, the stored data payloads 210 may represent event data that were previously processed and stored on the event streaming/data lake 258 or event data that were otherwise stored in an external data storage system. For example, some organizations have a high volume of data that is kept in storage systems (e.g., S3, Azure Blob Store, etc.) for warehousing purposes, or they may have event data that can be scraped from a REST endpoint (e.g., Prometheus). The collection module may allow organizations to apply the observability pipeline process 200 to data from storage, REST endpoints, and other systems regardless of whether the data has been processed by an observability pipeline system in the past. The data collection module can retrieve the data from the stored data payload 210 on the external data storage system, stream the data to the observability pipeline process 200 (e.g., via the schema normalization module, the routing module, or a streaming analytics and processing module), and send the output to any of the data destinations 230.

Figure 3:
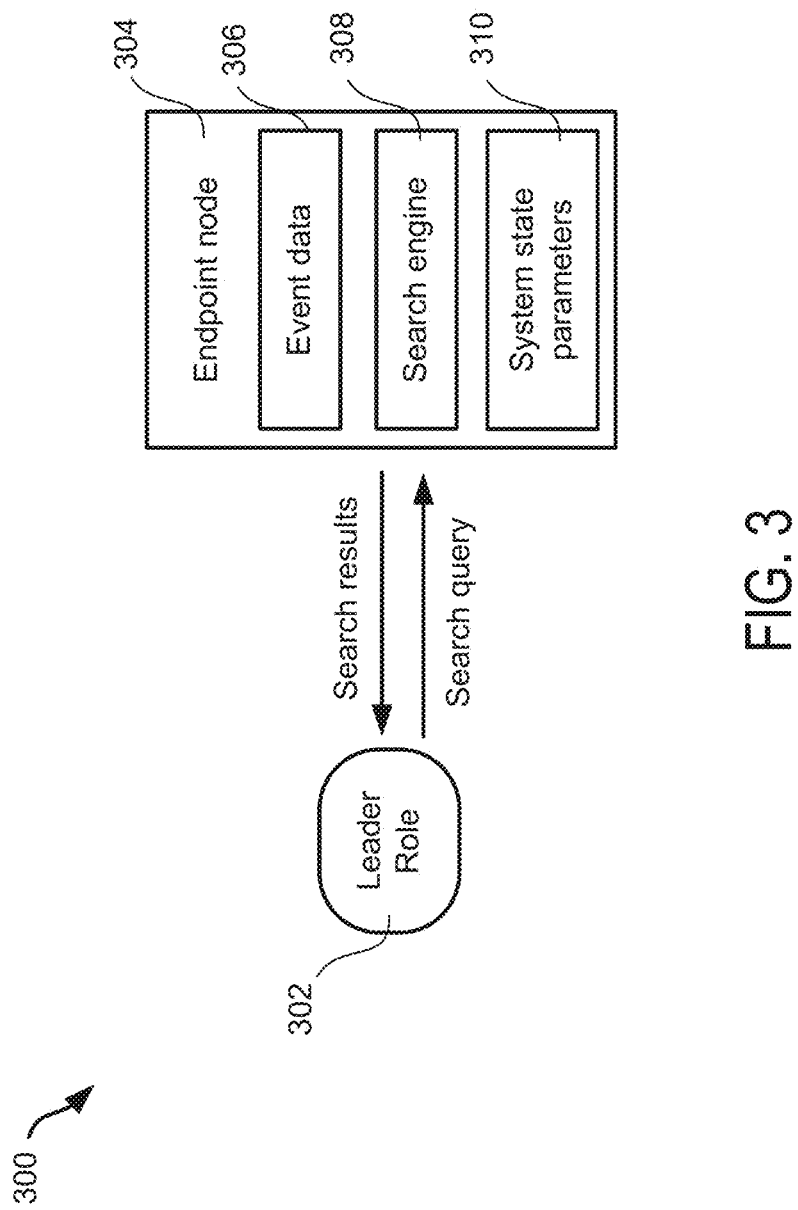
FIG. 3 is a schematic diagram showing aspects of an example computing environment.

FIG. 3 is a schematic diagram showing aspects of an example computing environment 300. The example computing environment 300 includes a leader role 302 and an endpoint node 304 that communicate with each other. A search engine 308 of an observability pipeline system operates on the endpoint node 304; and event data 306 is stored at the same endpoint node 304. In some implementations, the endpoint node 304 may be implemented as the data source 102 or another device or node in the example computing environment 100 shown in FIG. 1. The leader role 302 may be implemented as the leader role 112 as shown in FIG. 1 or in another manner. The computing environment 300 may include additional or different features, and the elements of the computing environment 300 may be configured to operate as described with respect to FIG. 3 or in another manner. For example, the computing environment 300 may include multiple endpoint nodes, data storage, data sources, user devices, or other units which are communicably connected to the leader role 302.

In some implementations, the search engine 308, as part of an observability pipeline system, may be deployed as an application or another type of software module running on the endpoint node 304. In some instances, the search engine 308 is configured to collect, access, and process local data (e.g., the event data 306 and the system state parameters 310 at the endpoint node 304). In some instances, the search engine 308 allows users (e.g., through a user interface at the leader role 302) to specify search parameters for filtering and selecting log files; to specify and optimize data collection parameters for obtaining data from the selected log files; to configure an observability pipeline process; to access system state parameters of the endpoint node 304; to perform a search process by applying the observability pipeline process on the event data; to obtain search results; to perform pre-processing to the collected data; and to route the search results to leader role 302. In some implementations, the search engine 308 of the endpoint node 304 includes a computing resource for configuring an observability pipeline process, performing a search process by applying the observability pipeline process; and performing other functions. The computing resource may include dynamically assigned computing resources, etc.

In some implementations, the endpoint node 304 includes memory or data storage configured to store the event data 306. The event data 306 stored at the endpoint node 304 may be locally generated at the endpoint node 304 and may include data such as the event data 202 shown in FIG. 2. The event data 202 may include untransformed observability data which is not yet processed by an observability pipeline system. In some instances, the search engine 308 can access memory units at the endpoint node 304, which can also be configured to store search results, or other data.

In some implementations, a search query is received by the search engine 308 of the observability pipeline system at the endpoint node 304 in FIG. 3 from the leader role 302. In some instances, a search query may be created by a user device and received by the leader role 302 from the user device; may be created through a user interface at the leader role 302, or in another manner. A search query, including multiple search operators, requests to search the event data 306 at the endpoint node 304. The leader role 302 identifies the endpoint node 304 at which the event data 306 reside according to the search query and communicates the search query to the search engine 308 of the endpoint node 304.

In some implementations, a search query further requests to check the system state parameters 310 of the endpoint node 304. In other words, a search query can filter processes according to one or more process characteristics specified by one or more search operators. Such search operators may specify target values of system state contexts indicating a process characteristic. In some instances, a system state context may include whether a process is currently running, whether a process is currently listening on the network; whether a process is currently utilizing a central processing unit (CPU) resource at or above a threshold value; whether a process is currently writing to log files; and other process characteristics. In some instances, a target value of a system state context can be a binary target value indicating that the search is targeting data from a process that is (or is not) currently running, currently listening on the network, or currently writing to a log file on the endpoint node 304. In some instances, a target value of a system state context may be a numerical value or a numerical range. For example, a target value may be a threshold value of a CPU resource utilization of a process, e.g., 70%, 80% or another value. In some instances, the system state contexts may indicate other process characteristics; and the target value of the system state contexts may be in a different format.

In an example, a search query includes a first search operator that specifies a system state context criterion, and the search engine 308 identifies the first search operator in the search query. Based on the first search operator in the search query, the search engine 308 obtains current values of system state parameters at the endpoint node 304. In some implementations, the system state parameters 310 of the endpoint node 304 are indicative of resource utilization, activities, processes, hardware, network interfaces, listening ports, logged-in users, and other software or hardware information of the endpoint node 304. In some instances, the values of the system state parameters may be obtained by a process monitoring or system monitoring program operating on the endpoint node 304. In some instances, the search engine 308 can determine that a current system state of the endpoint node 304 matches the system state context criterion specified by the first search operator. For example, processes that have system state parameters matching the target values (e.g., are currently running and listening on the network, currently running with a CPU resource utilization above 80%, currently running and writing a log file, when a temperature on the hardware reaches above a certain temperature, etc.) can be identified by the search engine 308.

Continuing the example from above, in response to the determination that a current system state of the endpoint node 304 matches the system state context criterion specified by the first search operator, the search engine 308 searches the event data 306. Performing the search identifies a subset of the event data on the endpoint node 304 that matches the event criterion specified by the second search operator in the search query. For example, when the system state context criterion includes a target value of a system state context associated with processes running on the computer node, the search can be directed to event data generated by processes that have current system state parameter values matching the target values. In some implementations, the search results are communicated back to the leader role 302 or a different result destination for storage, processing or analysis.

When an observability pipeline process is configured by the search engine 308 according to the search query, parameters (e.g., dataset providers, pipelines, routes, results destinations, etc.) of the observability pipeline process can be configured according to the search query such that the event data generated by the one or more identified processes on the endpoint node 304 can be routed to the pipelines according to the routes; and search results including structured output data can be generated from the event data by operation of the pipelines. In some instances, the search engine 308 can configure the pipelines of the observability pipeline process according to the types of search operators in the search query. For example, the first search operator specifying a check of system state parameters can be prioritized.

In some implementations, search results, including a subset of events in the event data 306, are obtained by the search engine 308 when applying the observability pipeline process on a subset of events of the event data 306. In some instances, the search engine 308 may be configured to perform other pre-processing to the search results prior to transmitting them back to the leader role 302.

Figure 4:
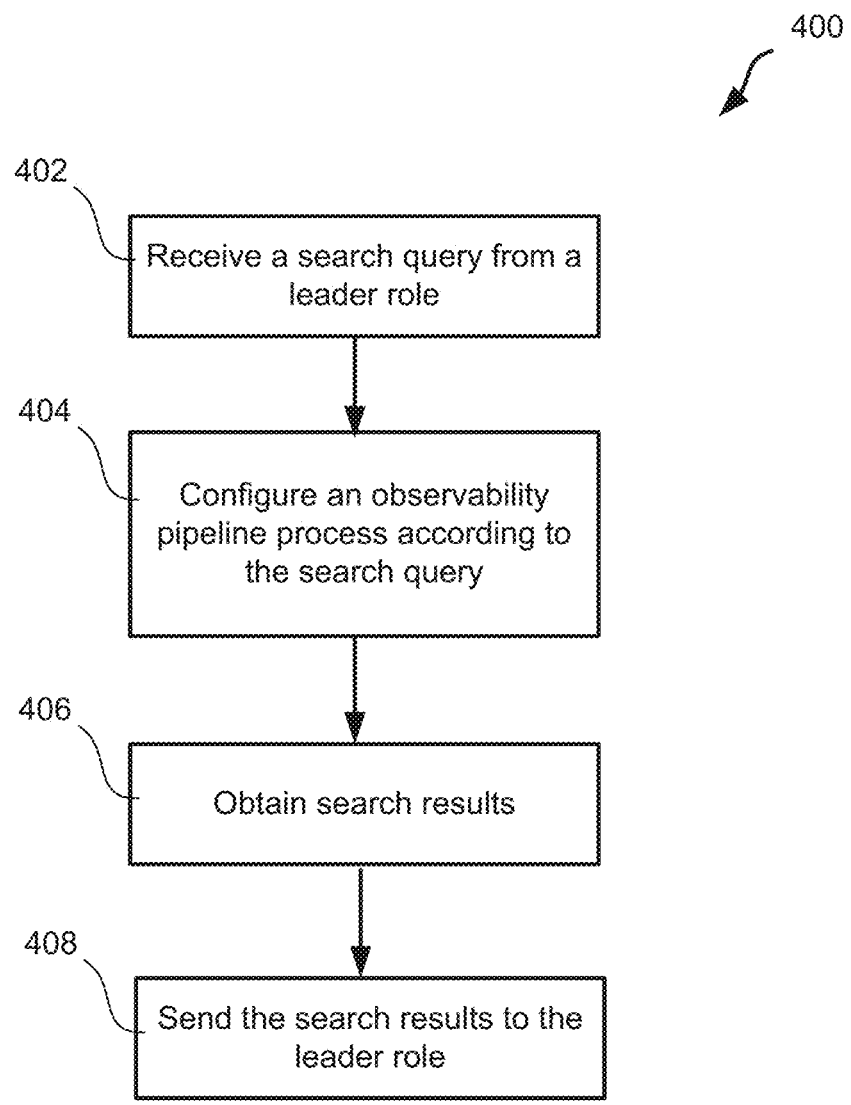
FIG. 4 is a flow chart showing aspects of an example search process.

FIG. 4 is a flow chart showing aspects of an example search process 400. In some implementations, the operations of the example process 400 are performed by operation of a computer node. For example, the computer node may be implemented as the data sources 102 in FIG. 1, the endpoint node 304 as shown in FIG. 3, or another type of computer node of a computer system. The example search process 400 may include additional or different operations, including operations performed by additional or different components, and the operations may be performed in the order shown or in another order.

The example search process 400 shown in FIG. 4 can deploy search computation to data sources or endpoint nodes. Such deployment can keep data-heavy operations close to the data stored at the data sources, allowing data to remain distributed, thus reducing cost and latency on data transportation. The example search process 400 can prioritize search operators that specify target values of system state contexts for filtering processes; identify a subset of processes based on the target values of the system state contexts and values of system state parameters; and obtain search results by performing search on events generated by the identified subset of processes. The example search process 400 may provide additional advantages and improvements in some cases.

At 402, a search query is received. In some implementations, the search query is received by the computer node from a leader role of an observability pipeline system (e.g., by the endpoint node 304 from the leader role 302 in FIG. 3). The computer node includes a search engine that can configure an observability pipeline process and apply the observability pipeline process to filter system state context (e.g., associated processes, hardware, etc.) on the computer node, and perform a search in response to identifying a targeted system state context. In some implementations, the search engine may be implemented as the search engine 308 in FIG. 3 or in another manner. In some instances, the search query may be received by the leader role 302 remotely from the user device via the network (e.g., through a browser) or locally configured via a user interface (e.g., that includes a query box where a search query to run can be entered).

In some implementations, the search query when generated at the leader role, includes location information of data sources (e.g., bucket name, object-store prefix, access permissions, etc.) specifying the computer node to be search; functions and search operators that specify one or more search criteria (e.g., dataset providers, filters, functions, search operators, etc.); location information of results destination specifying where search results are distributed; and other information. In some implementations, the search query requests information about event data at the computer node (e.g., produced and stored at the endpoint node 304 in FIG. 3). In some implementations, the leader role identifies the computer node based on the search query. In some instances, the computer node may include servers, databases, host services, a local or remote file system location, a network file system, Amazon S3 buckets, S3-compatible stores, or other data storage systems.

In some implementations, the event data includes observability pipeline output data generated by the observability pipeline process (e.g., the example pipeline output data 203 shown in FIG. 2). In other implementations, the event data may be raw machine data and yet unprocessed observability data generated by processes, or a combination of these. In certain instances, the search query may request information about data stored at multiple computer resources (e.g., multiple distinct computer nodes residing at different geo-locations). In this case, the multiple computer nodes may be identified by the leader role according to the search query.

In some implementations, the search query includes a first type of search operators, where each search operator of the first type specifies a system state context criterion. The system state context criterion may be configured to filter processes on the computer node. For example, search operators of the first type may specify a CPU utilization percentage, whether a process is currently running, whether a process is currently writing to a log file, whether a process is currently listening to the network, etc. The system state context criterion may be configured to filter hardware, listening ports, logged-in users, network interfaces, or other aspects of the computer node. For example, search operators of the first type may specify a current temperature or a current temperature range of hardware on the computer node, e.g., motherboard, CPU, GPU, hard drive, etc.; a current rotational speed or a current speed range of the fan of the power supply; a list of currently logged in users; a current state of all network interfaces; a current buffer size of the network, disk, and interface; a current signal strength or a current signal strength range on wireless communication interfaces (e.g., Wi-Fi); and a current list of all listening ports across all processes. In some implementations, the first type of search operator is configured to perform a set of point-in-time checks or probes that yield information about the state of the system, e.g., the system state context. In other words, the system state context is dynamic, whereas data residing in a log file is typically static. For example, hardware, listening ports, logged-in users, network interfaces and other aspects of the computer node change over time. Current values of the system state context can be identified in real-time. In other words, the system state context can be queried, e.g., by identifying current values of system state parameters; and comparing the current values of the system state parameters with target values of the system state context specified by the first type of search operators in the search query.

In some implementations, the search query includes a second type of search operator, where each search operator of the second type specifies an event criterion. The event criterion may be configured to filter events on the computer node. For example, search operators of the second type may specify events that include certain characters or text strings, events generated in a certain timeframe, events of a certain type, events associated with certain processes or users, etc.

In some implementations, the search operators of each type can be identified by the search engine running on the computer node. For example, search operators of the first type or second type can be tracked and emitted by operation of the search engine, communicated to the leader role, and made available to users (e.g., as fields) when a search query to perform a search process on the data source is generated.

At 404, an observability pipeline process is configured to perform a search according to the search query. The observability pipeline process includes pipelines and routes. When the observability pipeline process is configured, the routes and pipelines are configured according to the search query. In some implementations, the observability pipeline process includes one or more data sources. When the observability pipeline process is configured, the one or more data sources are also determined according to the search query. When a search query is received by the search engine 308 at the endpoint node 304, orders of the search operators, functions, and their target values in pipelines and routes of the observability pipeline process may be configured. In some implementations, the types of the search operators in a search query can be identified by the search engine. Orders of search operators are organized in the observability pipeline process, for example, according to the type of search operators, the dataset providers, etc. In some implementations, the ordering the search operators can optimize the overall processing performance without influencing the result of the search operation.

For example, an initial search query received by the data source from the computer node may include:
In all systems
search for "error" on all log files
currently written to by running processes
where cpu_util>90%
where network_listening='true'

Instead of applying the search operators in their current order as shown in the initial search query, the types of the search operators can be identified, and the orders of the search operators can be adjusted according to the search operators. For example, an example reorganized search query may include:
where network_listening='true'
where cpu_util>90%
currently written to by running processes
open and read files
search for "error" included the files As shown in the example above, search operators of the first type which target system state parameters (e.g., where network_listening='true', where cpu_util>90%, currently written to by running processes, open and read files) can be prioritized over search operators of the second type that target event data (e.g., search for "error" included the files), when the observability pipeline process is configured.

In some instances, in response to the search query requesting searches of event data stored at multiple computer nodes, multiple computer nodes may be configured and initiated; and respective observability pipeline processes may also be configured to perform searches at the respective computer nodes according to the search query.

At 406, search results are obtained. In some implementations, search results are obtained by an observability pipeline process, e.g., by performing operations in the example observability pipeline process 200 as shown in FIG. 2 or in another manner. In some implementations, the computer node is configured to generate the search results by scanning and processing the system state parameters and the event data based on the observability pipeline process, e.g., filtering, aggregating, enhancing, and other processing operations. The observability pipeline process can first determine that a current state of the computer node matches the system state context criterion specified by the first type of search operators in the search query. In response to the determination, the observability pipeline process can search event data on the computer node and identify a subset of the event data that matches the event criterion specified by the search operators of the second type.

In some cases, the system state context criterion specified by the search query includes a target value of a system state context associated with processes on the computer node. In such cases, current values of system state parameters for processes that are currently running on the computer node are identified, and the search process may determine that the current values of the system state parameters for a subset of the processes match the target value of the system state context. In such instances, the search process can identify a subset of event data that is generated by the subset of processes and match the event criteria. For example, the subset of the processes may include the processes that are currently listening on a network; the subset of the processes may include the processes that are currently utilizing a central processing unit (CPU) resource at or above a threshold value; the subset of the processes may include the processes that are currently writing to log files, etc.

In some instances, the system state context criterion specified by the search query includes a target value of a system state context associated with hardware on the computer node. In such cases, current values of system state parameters for hardware on the computer node are identified, and the search process may determine that the current values match the target values. In such instances, the search process can identify event data at the computer node that match the event criteria.

In some implementations, multiple sets of search results may be obtained from the multiple respective computer nodes by applying the respective observability pipeline processes to respective sets of system state parameters and respective event data on the respective computer nodes. In some instances, multiple sets of search results may be obtained in different manners.

At 408, the search results are communicated to the leader role. In some instances, the search results can be displayed to the user via the user interface on the leader role. In response to multiple sets of search results being obtained, the received multiple sets of search results may be post-processed (e.g., aggregated or merged) at the leader role before being presented to the user device or routed to other results destinations.

Figure 5:
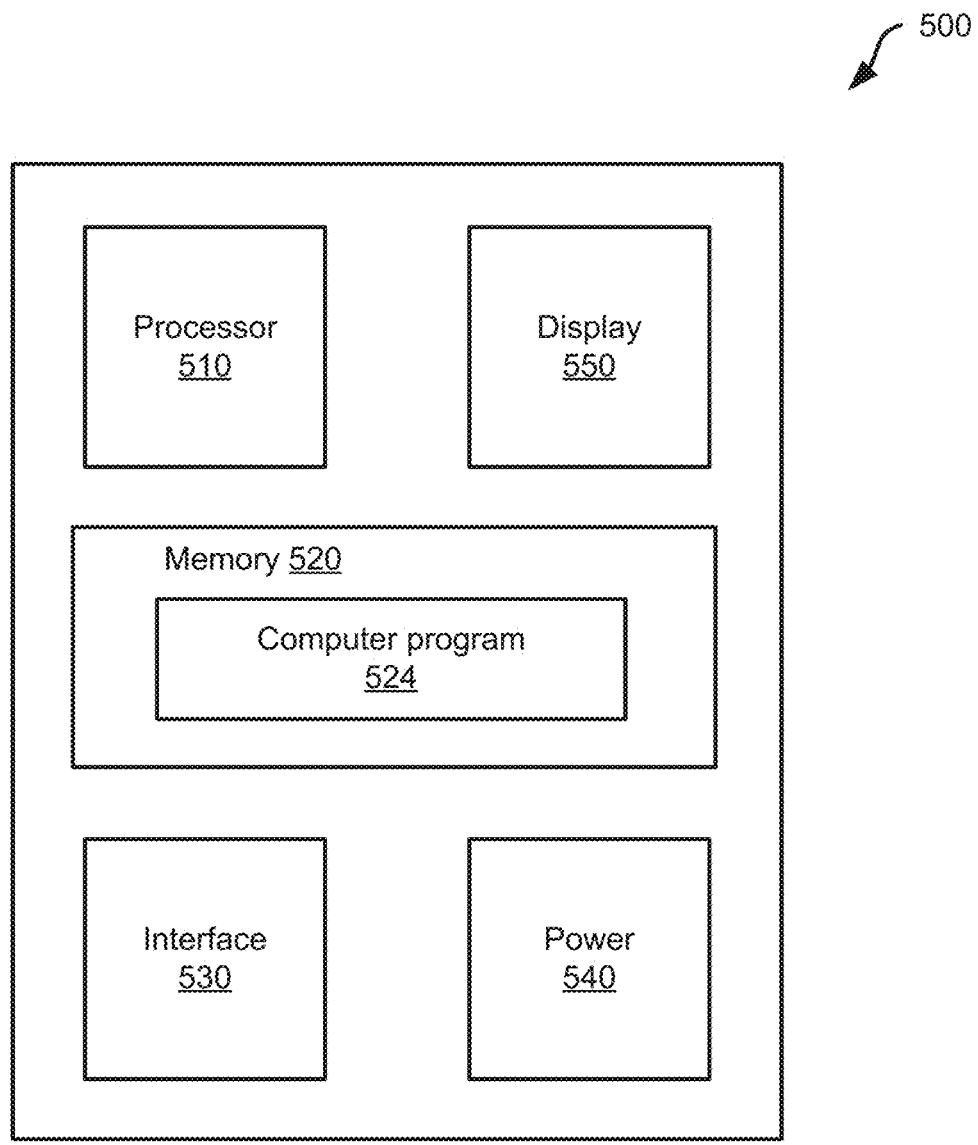
FIG. 5 is a block diagram showing an example computer system.

FIG. 5 is a block diagram showing an example computer system 500 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 510. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 524, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 510, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 520. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 540 provides power to the other components of the computer system 500. For example, the other components may operate based on electrical power provided by the power unit 540 through a voltage bus or other connection. In some implementations, the power unit 540 includes a battery or a battery system, for example, a rechargeable battery. In some implementations, the power unit 540 includes an adapter (e.g., an AC adapter) that receives an external power signal (from an external source) and converts the external power signal to an internal power signal conditioned for a component of the computer system 500. The power unit 540 may include other components or operate in another manner.

To provide for interaction with a user, operations can be implemented on a computer having a display device, e.g., display 550, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 500 may include a single computing device or multiple computers that operate in proximity or generally remote from each other and typically interact through a communication network, e.g., via interface 530. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 530 may provide communication with other systems or devices. In some cases, the interface 530 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 530 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect of what is described, a search scope of a search process is configured in an observability pipeline system.

In a first example, a search method includes at a computer node in a computer system, receiving a search query from a leader role of an observability pipeline system. The search query represents a request to search event data at the computer node; and the search query includes a first search operator that specifies a system state context criterion; and a second search operator that specifies an event criterion. The search method further includes configuring an observability pipeline process according to the search query; and obtaining search results based on applying the observability pipeline process at the computer node. Applying the observability pipeline process includes determining that a current system state of the computer node matches the system state context criterion specified by the first search operator; and in response the determination, identifying a subset of event data on the computer node that matches the event criterion specified by the second search operator. The search method further includes sending the search results to the leader role. The search results include the subset of event data.

Implementations of the first example may include one or more of the following features. The system state context criterion includes a target value of a system state context associated with at least one of: processes on the computer node; hardware on the computer node; listening ports on the computer node; logged-in users on the computer node; or network interfaces on the computer node.

Implementations of the first example may include one or more of the following features. The system state context criterion includes a target value of a system state context associated with processes on the computer node, and determining that the current system state of the computer node matches the system state context criterion includes identifying current values of system state parameters for processes that are currently running on the computer node; and determining that the current values of the system state parameters for a subset of the processes match the target value of the system state context. The subset of event data is generated by the subset of processes. The system state contexts include whether a process is currently running and whether a process is currently listening on the network. The subset of the processes includes the subset of the processes that is currently running and is currently listening on the network. The system state contexts include whether a process is currently running and whether a process is currently utilizing a central processing unit (CPU) resource at or above a threshold value. The subset of the processes includes the subset of the processes that is currently running and is currently utilizing the CPU resource above the threshold value. The system state contexts include whether a process is currently running and whether process is currently writing to log files. The subset of the processes includes the subset of the processes that is currently running and is currently writing to log files. Generating the search results includes searching events from the log files based on the search query. The search results include a subset of the events from the log files.

Implementations of the first example may include one or more of the following features. The observability pipeline process includes pipelines and routes, and applying the observability process to the event data includes routing the event data by operation of the routes; and by operation of the pipelines, generating structured output data from the routed event data. The system state context criterion includes a target value of a system state context associated with hardware on the computer node. Determining that the current system state of the computer node matches the system state context criterion includes identifying current values of system state parameters for hardware on the computer node; and determining that the current values of the system state parameters for the hardware match the target value of the system state context.

In a second example, a computer node includes one or more processors and memory storing instructions that are configured, when executed by the one or more processors, to perform one or more operations of the first example.

In a third example, a non-transitory computer-readable medium stores instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A search method for searching event data in an observability pipeline system, the search method comprising:
   at a computer node in a computer system, receiving a search query from a leader role of the observability pipeline system, the search query representing a request to search the event data at the computer node, the search query comprising a plurality of search operators, the plurality of search operators comprising:
      a first search operator that specifies a system state context criterion; and
      a second search operator that specifies an event criterion;
   configuring an observability pipeline process according to the search query;
   obtaining search results based on applying the observability pipeline process at the computer node, wherein applying the observability pipeline process comprises:
      determining whether a current system state of the computer node matches the system state context criterion specified by the first search operator, wherein the system state context criterion comprises a target value of a system of a system state context associated with processes on the computer node, and determining whether the current state of the computer node matches the system state criterion comprises:
         identifying current values of system state parameters for processes that are currently running on the computer node, and
         determining whether the current values of the system state parameters for a subset of the processes match the target value of the system state context; and
      only upon determining that the current system state of the computer node matches the system state context criterion specified by the first search operator, searching the event data from log files on the computer node using the event criterion specified by the second search operator to identify a subset of the event data on the computer node that matches the event criterion specified by the second search operator and including the subset of the event data from the log files in the search results, wherein the subset of the event data is generated by the subset of processes; and
   sending the search results to the leader role.

2. The method of claim 1, wherein the system state context comprises whether a process is currently running and whether a process is currently listening on a network, and the subset of the processes comprises the subset of the processes that is currently running and is currently listening on the network.

3. The method of claim 1, wherein the system state context comprises whether a process is currently running and whether a process is currently utilizing a central processing unit (CPU) resource at or above a threshold value, and the subset of the processes comprises the subset of the processes that is currently running and is currently utilizing the CPU resource above the threshold value.

4. The method of claim 1, wherein the system state context comprises whether a process is currently running and whether process is currently writing to the log files, and the subset of the processes comprises the subset of the processes that is currently running and is currently writing to the log files.

5. The method of claim 1, wherein the observability pipeline process comprises pipelines and routes, and applying the observability pipeline process to the event data comprises:
   routing the event data by operation of the routes; and
   by operation of the pipelines, generating structured output data from the routed event data.

6. An observability pipeline system configured to search event data in the observability pipeline system, comprising:
   a computer node in a computer system, the computer node comprising one or more processors and memory that stores instructions that are configured, when executed by the one or more processors, to cause the one or more processors to:
      receive, at the computer node, a search query from a leader role of the observability pipeline system, the search query representing a request to search the event data at the computer node, the search query comprising a plurality of search operators, the plurality of search operators comprising:
         a first search operator that specifies a system state context criterion; and
         a second search operator that specifies an event criterion;
      configure an observability pipeline process according to the search query;
      obtain search results based on application of the observability pipeline process at the computer node, wherein application of the observability pipeline process causes the one or more processors to:
         determine whether a current system state of the computer node matches the system state context criterion specified by the first search operator, wherein the system state context criterion comprises a target value of a system of a system state context associated with processes on the computer node, and the determination of whether the current state of the computer node matches the system state criterion further causes the one or more processor to:
            identify current values of system state parameters for processes that are currently running on the computer node, and
            determine whether the current values of the system state parameters for a subset of the processes match the target value of the system state context; and only upon a determination that the current system state of the computer node matches the system state context criterion specified by the first search operator, search event data on the computer node using the event criterion specified by the second search operator to identify a subset of the event data from log files on the computer node that matches the event criterion specified by the second search operator and include the subset of the event data from the log files in the search results, wherein the subset of the event data is generated by the subset of the processes; and send the search results to the leader role.

7. The observability pipeline system of claim 6, wherein the system state context comprises whether a process is currently running and whether a process is currently listening on a network, and the subset of the processes comprises the subset of the processes that are currently running and are currently listening on the network.

8. The observability pipeline system of claim 6, wherein the system state context comprises whether a process is currently running and whether a process is currently utilizing a central processing unit (CPU) resource at or above a threshold value, and the subset of the processes comprises the subset of the processes that are currently running and are currently utilizing the CPU resource above the threshold value.

9. The observability pipeline system of claim 6, wherein the system state context comprises whether a process is currently running and whether process is currently writing to the log files, and the subset of the processes comprises the subset of the processes that are currently running and are currently writing to the log files.

10. The observability pipeline system of claim 6, wherein the observability pipeline process comprises pipelines and routes, and application of the observability pipeline process to the event data includes further instructions that cause the one or more processors to route the event data by operation of the routes, and by operation of the pipelines, generate structured output data from the routed event data.

11. A non-transitory computer-readable medium storing instructions that are operable when executed by data processing apparatus to perform operations for searching event data in an observability pipeline system, the operations comprising:

receiving, at a computer node in a computer system, a search query from a leader role of the observability pipeline system, the search query representing a request to search the event data at the computer node, the search query comprising a plurality of search operators, the plurality of search operators comprising:
  a first search operator that specifies a system state context criterion; and
  a second search operator that specifies an event criterion;
configuring an observability pipeline process according to the search query;
obtaining search results based on applying the observability pipeline process at the computer node, wherein applying the observability pipeline process comprises:
  determining whether a current system state of the computer node matches the system state context criterion specified by the first search operator, wherein the system state context criterion comprises a target value of a system of a system state context associated with processes on the computer node, and determining whether the current state of the computer node matches the system state criterion comprises:
    identifying current values of system state parameters for processes that are currently running on the computer node, and
    determining whether the current values of the system state parameters for a subset of the processes match the target value of the system state context; and
  only upon determining that the current system state of the computer node matches the system state context criterion specified by the first search operator, searching the event data from log files on the computer node using the event criterion specified by the second search operator to identify a subset of the event data on the computer node that matches the event criterion specified by the second search operator and including the subset of the event data from the log files in the search results, wherein the subset of the event data is generated by the subset of the processes; and
sending the search results to the leader role.

* * * * *